United States Patent Office 3,365,501
Patented Jan. 23, 1968

3,365,501
PREPARATION OF MIXTURES OF METHYL-CYCLOHEXANONE PEROXIDES HAVING IMPROVED STABILITY
Dirk Willem van Gelder, Maasniel, Netherlands, assignor to Koninklijke Industrieele Maatschappij vorheen Noury & van der Lande N.V., Deventer, Netherlands, a corporation of the Netherlands
No Drawing. Filed Oct. 22, 1963, Ser. No. 318,070
Claims priority, application Great Britain, Oct. 26, 1962, 40,625/62
2 Claims. (Cl. 260—610)

The present invention relates to a process for the preparation of mixtures of methylcyclohexanone peroxides which have improved stability.

Mixtures of methylcyclohexanone peroxides are used in the polymerization of unsaturated compounds and in the copolymerization of unsaturated polyesters with vinyl- and allyl-monomers. These mixtures of peroxides can be obtained by reacting technical methylcyclohexanone with an aqueous solution of hydrogen peroxide, and subsequently isolating the resultant mixture of methylcyclohexanone peroxides. The composition of the reaction mixture thus obtained is dependent on the ratio of the concentrations of the ortho-, meta- and para-isomers in the initial methylcyclohexanone, as well as on the ratio in which this starting material is mixed with the hydrogen peroxide. Consequently, it is assumed that in the reaction mixture thus formed, a rather large number of peroxides and hydroperoxides having either one or two cyclohexanone nuclei per molecule may be present. In the latter case, not only peroxy but also hydroperoxy groups may be present in the same molecule. In such a mixture the active oxygen content may vary between the limits 3 to 13%.

However, mixtures of methylcyclohexanone peroxides prepared by this known method suffer from the disadvantage that after some time their properties alter more or less, so that difficulties arise during their use. Thus, when the mixtures are stored at a temperature of about 20° C., the active oxygen content decreases by several tens of percents of the original value within a period of some months or even of some weeks.

Furthermore, changes in the polymerization activity occur; frequently there is an increase initially but ultimately a decrease occurs. This is especially the case when the active oxygen content has reached rather low values. For this reason, the preparation of a mixture of methylcyclohexanone peroxides having a constant content of active oxygen is of the highest importance from the viewpoint of the technical uses of such mixtures.

If the storage temperature is increased somewhat, e.g. to 30° or 40° C., the above mentioned deleterious changes occur at a considerably faster rate. This fact can be made use of to enable the stability of the cyclohexanone mixtures to be determined experimentally within a reasonable time.

It has now been found that the stability, by which in this context is meant the maintenance of an almost constant content of active oxygen, of mixtures of methylcyclohexanone peroxide may be considerably increased if these mixtures are prepared from a technical methylcyclohexanone which does not contain more than 30% by weight, and preferably less than 10%, of the orthoisomer.

For it appears that notwithstanding the great structural similarity of the three isomers, meta- and para-methylcyclohexanone give a much more stable mixture of peroxides than the ortho component under otherwise comparable conditions. Also, in mixtures of the three isomers the para- and meta-isomers play a more favorable part. Moreover, a mixture of the kind in question has the additional advantage that there is a higher yield of active oxygen in the synthesis.

In order that the present invention may be still more readily understood by those skilled in the art, the following illustrative examples are given. The gel time mentioned in the examples was determined at 20° C. in a mixture containing 100 parts by weight of the unsaturated polyester resin Palatal P6 (made by B.A.S.F.), 0.5 part by weight of cobalt octoate in dioctylphthalate with a cobalt content of 1%, and 1 part by weight of the methylcyclohexanone peroxides mixture diluted with triethylphosphate.

EXAMPLE 1

50 parts by weight of technical ortho-methylcyclohexanone were mixed with 50 parts by weight of 35% hydrogen peroxide. Sulphuric acid was added to the mixture in such a quantity that the total quantity of mineral acid, i.e. including that already present in the hydrogen peroxide, amounted to 12 m. eq. per litre of 35% hydrogen peroxide. Thereafter the reaction mixture was heated to 45° C. and it was stirred at this temperature for 1½ hours. At the end of this stage 1 part of anhydrous magnesium sulphate was added. A phase separation took place; after which the layers were separated; the organic peroxides were in the upper layer.

The yield of methylcyclohexanone peroxides was 60 parts by weight, with an active oxygen content of 8.3% determined by iodometric titration. The yield of active oxygen was 60.5%.

EXAMPLE 2

In a similar manner to that described in Example 1, but starting from 50 parts by weight of meta-methylcyclohexanone, 66 parts by weight of a methylcyclohexanone peroxide mixture with a content and a yield of active oxygen of 10.0% and 80.2% respectively, were obtained.

EXAMPLE 3

In a similar manner to that described in Example 1, but starting from 50 parts by weight of para-methylcyclohexanone, 50 parts by weight of a methylcyclohexanone peroxide mixture with a content and a yield of active oxygen of 10.3% and 70.2% respectively, were obtained.

EXAMPLE 4

The mixtures of peroxides obtained according to Examples 1, 2 and 3 were diluted with triethylphosphate to an active oxygen content of 6 to 7%. Thereafter they were stored for 2 weeks at 40° C. The content of active oxygen and the gel time (as a measure of the polymerization activity) were determined at the beginning and at the end of this period. The results were as follows:

|  | Example No. | | |
|---|---|---|---|
|  | 1 | 2 | 3 |
|  | Starting Isomer | | |
|  | Ortho | Meta | Para |
| Active oxygen content (percent): | | | |
| Initially | 6.4 | 6.2 | 7.4 |
| After 2 weeks | 2.9 | 6.1 | 7.2 |
| Gel time (minutes): | | | |
| Initially | 14 | 11 | 14 |
| After 2 weeks | 70 | 20 | 18 |

EXAMPLE 5

50 parts by weight of a mixture containing 50% by weight of meta- and 50% by weight of para-methylcyclohexanone were mixed with 50 parts by weight of 35% hydrogen peroxide. Sulphuric acid was added to the mixture in such a quantity that the total quantity of mineral acid, i.e. including that already present in the hydrogen peroxide, amounted to 12 m. eq. per litre of 35% hydrogen peroxide. Thereafter the reaction mixture was heated to 45° C. and it was stirred at this temperature for 1½ hours. At the end of this stage 1 part of anhydrous magneseium sulphate was added. A phase separation took place, after which the layers were separated; the organic peroxides were in the upper layer from which they were isolated.

The yield of methylcyclohexanone peroxide was 60 parts by weight, with an active oxygen content of 9.45%. The yield of active oxygen was 70.0%.

EXAMPLE 6

In a similar manner to that described in Example 5, but starting from 50 parts by weight of a mixture containing 5% by weight of ortho-, 47.5% by weight of meta-, and 47.5% by weight of para-methylcyclohexanone, 60 parts by weight of a methylcyclohexanone peroxide mixture with a content and a yield of active oxygen of 9.45% and 70.0% respectively, were obtained.

EXAMPLE 7

In a similar manner to that described in Example 5, but starting from 50 parts by weight of a mixture containing 30% by weight of ortho-, 35% by weight of meta-, and 35% by weight of para-methylcyclohexanone, 61.5 parts by weight of a methylcyclohexanone peroxide mixture with a content and a yield of active oxygen of 9.17% and 68.5% respectively, were obtained.

EXAMPLE 8

In a similar manner to that described in Example 5, but starting from 50 parts by weight of a mixture containing 60% by weight of ortho-, 20% by weight of meta- and 20% by weight of para-methylcyclohexanone, 63 parts by weight of a methylcyclohexanone peroxide mixture with a content and a yield of active oxygen of 8.70% and 66.5% respectively, were obtained.

EXAMPLE 9

The mixtures of peroxides obtained according to the Examples 5, 6, 7 and 8 were diluted with triethylphosphate in the ratio of 2 parts by weight of the given mixture to 1 part by weight of triethylphosphate. After storing for 1, 2 and 4 weeks at 40° C., the content of active oxygen and the gel time were determined. The results were as follows:

|  | Example No. | | | |
|---|---|---|---|---|
|  | 5 | 6 | 7 | 8 |
|  | Ortho-isomer in the mixture (percent) | | | |
|  | 0 | 5 | 30 | 60 |
| Active oxygen content (percent): | | | | |
| Initially | 6.25 | 6.30 | 6.09 | 5.79 |
| After 1 week | 6.12 | 6.15 | 5.95 | 4.86 |
| After 2 weeks | 6.00 | 6.07 | 5.66 | 3.76 |
| After 4 weeks | 5.43 | 5.35 | 4.73 | 1.98 |
| Gel time (minutes): | | | | |
| Initially | 8 | 8 | 8 | 9 |
| After 1 week | 23 | 22 | 23 | 23 |
| After 2 weeks | 33 | 34 | 33 | 40 |
| After 4 weeks | 40 | 39 | 42 | 54 |

While specific examples of preferred methods embodying the present invention have been set forth above, it will be understood that many changes and modifications may be made in the methods of procedure without departing from the spirit of the invention. It will therefore be understood that the examples cited and the particular proportions and methods of operation set forth above are intended to be illustrative only, and are not intended to limit the scope of the invention.

What is claimed is:
1. A fluid mixture of methylcyclohexanone peroxides having improved stability, and resulting from a procedure comprising mixing an isomeric mixture of methylcyclohexanones containing not more than 30% by weight of the ortho-isomer with an aqueous solution of hydrogen peroxide, adding a mineral acid in such a quantity that the total amount of mineral acid in the mixture is not higher than about 12 m. eq. per liter of 35% hydrogen peroxide, heating said mixture to a temperature of about 45° C. for a time sufficient to form methylcyclohexanone peroxides, and recovering said methylcyclohexanone peroxides from the reaction mixture by phase separation.

2. A fluid mixture of methylcyclohexanone peroxides having improved stability, and resulting from a procedure comprising mixing an isomeric mixture of methylcyclohexanones containing not more than 10% by weight of the ortho-isomer with an aqueous solution of hydrogen peroxide, adding a mineral acid in such a quantity that the total amount of mineral acid in the mixture is not higher than about 12 m. eq. per liter of 35% hydrogen peroxide, heating said mixture to a temperature of about 45° C. for a time sufficient to form methylcyclohexanone peroxides, and recovering said methylcyclohexanone peroxides from the reaction mixture by phase separation.

References Cited
UNITED STATES PATENTS 2,750,421  6/1956  Halbig et al. _____ 260—610

FOREIGN PATENTS 1,088,485  9/1960  Germany.

LEON ZITVER, *Primary Examiner.*

W. B. LONE, *Assistant Examiner.*